United States Patent [19]

Payton

[11] Patent Number: 4,562,861

[45] Date of Patent: Jan. 7, 1986

[54] DOUBLE-ENDED LIQUID LINE THERMAL INSULATOR

[75] Inventor: Kenneth J. Payton, Snohomish County, Wash.

[73] Assignee: Jay O. Payton, Bothell, Wash. ; a part interest

[21] Appl. No.: 629,643

[22] Filed: Jul. 11, 1984

[51] Int. Cl.[4] .......................... F16K 17/26; E03B 7/12
[52] U.S. Cl. ............................. 137/493.9; 137/513.3; 251/118; 138/32
[58] Field of Search ............ 137/334, 337, 493, 493.9, 137/513.3; 251/118; 138/26, 32

[56] References Cited

U.S. PATENT DOCUMENTS

| | | | |
|---|---|---|---|
| 2,823,695 | 2/1958 | Coffin | 137/337 |
| 2,915,080 | 12/1959 | Holmes | 137/337 |
| 2,955,613 | 10/1960 | Block | 137/493.9 |
| 3,437,065 | 4/1969 | Robbins, Jr. | 137/493.9 |
| 3,556,124 | 1/1971 | Walton | 137/337 |
| 3,730,224 | 5/1973 | Prisk | 251/118 |
| 4,033,375 | 7/1977 | Hirsch | 137/493.9 |
| 4,364,411 | 12/1982 | Payton et al. | 137/513.5 |
| 4,432,389 | 2/1984 | Jackson et al. | 137/543.13 |

Primary Examiner—Alan Cohan
Assistant Examiner—John A. Rivell
Attorney, Agent, or Firm—Robert W. Beach; Ward Brown

[57] ABSTRACT

Thermal conduction through a liquid line is deterred when liquid is not flowing through it by lodging a double-acting spring-centered plunger in a constricted section of a passage connecting opposite ends of a barrel in the line. Such plunger can be displaced from the passage constricted section in either direction to a passage expanded section automatically by pressure of liquid in the line resulting from opening a valve in the line.

7 Claims, 4 Drawing Figures

DOUBLE-ENDED LIQUID LINE THERMAL INSULATOR

BACKGROUND OF THE INVENTION

1. Field of the Invention

This invention relates to a thermal insulator in the form of a pipe coupling for inclusion in a liquid line through which liquid flows intermittently for the purpose of reducing heat loss through liquid in such line when liquid is not flowing through it.

2. Prior Art

A device intended to accomplish the same purpose as the present invention is disclosed in U.S. Pat. No. 4,364,411, issued Dec. 21, 1982. A representative situation is installation of the thermal insulator in the hot water line of a residence water system at a location adjacent to the water heater. The device of the present invention has substantial advantages over the liquid line thermal barrier disclosed in that patent with respect to adaptability and operation.

SUMMARY OF THE INVENTION

An object of the present invention is to provide a double-ended thermal insulator for liquid lines that can be installed like a pipe coupling in such a line, and the internal construction of which is symmetrical and double-acting so that the insulator will function in the same manner however the insulator is oriented in the liquid line.

Another object is to provide a dynamic thermal insulator for a liquid line that is of simple construction, effective in operation and sensitive so that it will respond promptly to enable liquid to flow through the liquid line on demand and will return promptly to its thermal insulating condition when the demand for liquid flow through the line has terminated.

A further object is to provide a dynamic thermal insulator, the moving parts of which are interchangeable, do not require close tolerances, so as to deter clogging of the insulator, and the operation of which performs a self-cleaning operation to minimize maintenance.

In order to enable the thermal insulator to be installed in a liquid line without regard to orientation of the insulator it is an object to provide a flow restricting component that is automatically self-centering when liquid is not flowing through the line, but the construction of which does not require critical centering.

It is also an object to provide a thermal insulator construction the design of which can be altered easily to provide different minimum degrees of communication through the thermal insulator when liquid is not flowing through the line, and which will be of nonsticking character despite extended intervals between times during which liquid is flowing through the line. Further, the construction is such that wear of the relatively moving parts is minimized.

An additional object is to provide a thermal insulator construction the moving parts of which will be moved quickly upon demand for flow of liquid through the line and which movement will abruptly provide the volume of flow through the line which is required, approaching maximum flow capacity of the liquid line.

Another object is to provide a thermal insulator construction that can accomplish the foregoing objects while being of compact and economical construction.

These objects can be accomplished by a thermal insulator having a spring-centered double-acting plunger lodged in a constricted passage through a barrel when no liquid is flowing through the liquid line in which the insulator is connected and which will be moved quickly in one direction or the other out of the constricted passage depending on the direction of flow through the liquid line when a valve in the line is opened to demand flow of liquid through the line.

DETAILED DESCRIPTION

Figure 1:
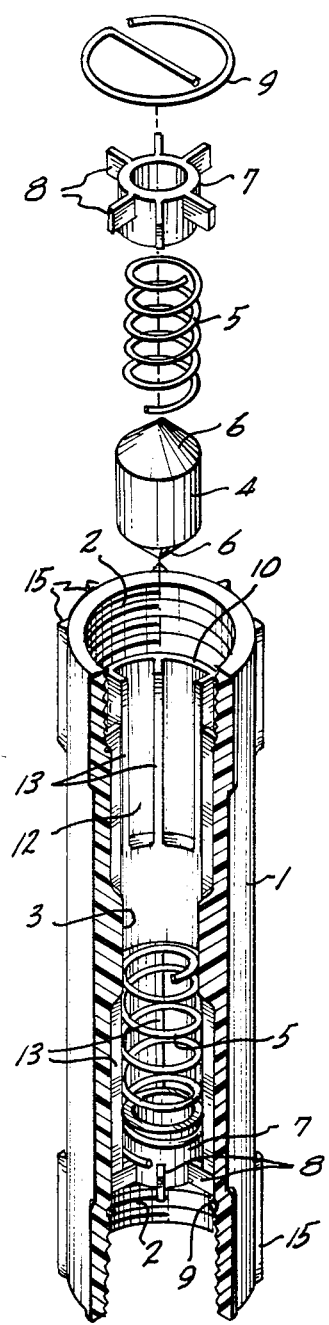
FIG. 1 is a top perspective of the thermal insulator with parts broken away and parts being shown in exploded relationship.
Figure 2:
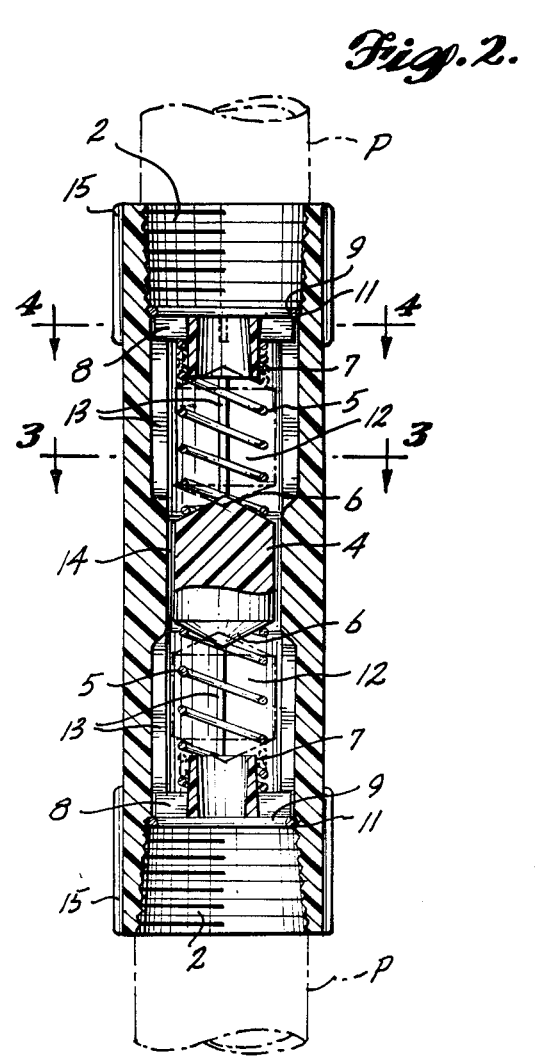
FIG. 2 is a longitudinal section through the thermal insulator taken on line 2—2 of FIG. 4.
Figures 3, 4:
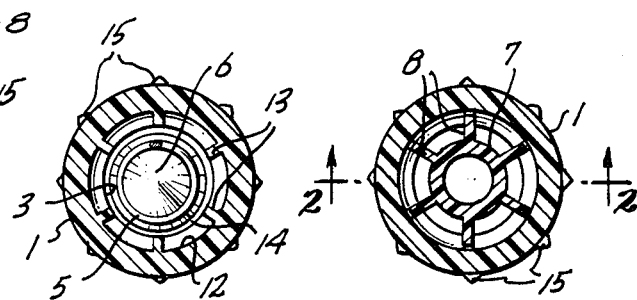
FIG. 3 is a transverse section through the thermal insulator taken on line 3—3 of FIG. 2.
FIG. 4 is a transverse section through the thermal insulator along line 4—4 of FIG. 2.

The thermal insulator includes a double-ended barrel 1 generally in the form of an elongated pipe coupling having female pipe threads 2 in its opposite ends for connection of the barrel conventionally to pipes P shown in phantom in FIG. 2. A passage connects such opposite barrel ends. Located symmetrically within the central portion of such passage is a constricted section 3 which preferably is not very much smaller than the passage through the pipes P forming the liquid line in which the thermal insulator is installed. The end portions of the barrel at opposite sides of such constricted passage section are substantially identical.

The purpose of the thermal insulator is to deter conduction through the insulator of heat whether such heat be conducted through the material of the insulator or through liquid within the insulator. To deter such heat conduction the insulator barrel 1 is made of thermal insulating material such as Teflon, i.e. tetrafluoroethylene, or polycarbonate, or CPVC, i.e. polyvinyl dichloride, or other thermal insulating plastic material. The thermal conductivities of such materials are specified in U.S. Pat. No. 4,364,411 at column 3, lines 15 to 25.

To deter conduction of heat through residual liquid in the thermal insulator when liquid is not flowing through the line the liquid communication through the constricted passage section 3 is restricted by lodging in such section, when there is no flow through the liquid line, a sliding reciprocable plunger 4. This plunger is spring-centered in the constricted passage section by being clamped between opposed helical compression springs 5 arranged in tandem and always engaged, respectively, with opposite ends of the slider 4. In order to center the slider transversely of its direction of movement each end 6 of the generally cylindrical slider is of shallow conical shape fitting within the ends of the respective springs 5. The cone angle of each slider end may be, for example, approximately 120°.

The ends of springs 5 remote from the slider encircle the ends of hollow bosses 7 forming hubs of spiders including arms 8 projecting radially from the ends of the hubs remote from the slider 4. Such spider arms fit snugly in the respective ends of the barrel 1. Each spider is retained against movement by the force of springs 5 away from the slider 4 by a retaining spring ring 9 seating on a shoulder 10 formed at the base of each female thread 2 and fitting into a retaining groove 11 adjacent to such shoulder.

When a valve is opened in the liquid line to induce flow of liquid through the line by the pressure of such liquid the differential in, liquid pressure acting on the opposite ends 6 of slider 4 will move such slider, in opposition to the differential in the forces of the springs 5 bearing on the opposite ends of the slider, lengthwise of the barrel 1, into an open position in an expanded section of the connecting passage communicating between opposite end portions of the barrel such as shown in broken lines in FIG. 2. In such position the slider will be clear of the passage constricted section 3. Adequate opportunity for flow of liquid around the slider in such position through the expanded section of the bore through the thermal insulator barrel will be afforded because the bore is expanded at opposite sides of the passage constricted section by the wall of the barrel between its opposite ends and the passage constricted section 3 having internal flutes 12 separated by ribs 13. The inner edges of such ribs are in axial alignment with the walls of the passage constricted section 3 so as to constitute guides for the slider 4 when it has been moved out of the constricted section 3 into an expanded section to a positon such as shown in broken lines in FIG. 2.

When the valve in the liquid line is closed, the liquid pressure in the bore of the thermal insulator barrle 1 at opposite sides of the slider 4 will equalize, enabling the differential in force exerted on the slider by the springs 5, which are substantially alike and are always engaged with the opposite ends of slider 4, respectively, to center the slider again in equipoise lodged in the passage constricted section 3 through the central portion of the barrel 1. When the slider is in such position shown in solid lines in FIG. 2 communication between the bodies of liquid in the opposite end portions of the barrel 1 is afforded only through the narrow annular passage or clearance 14 between the slider 4 and the passage constricted section 3. Consequently there is little conduction of heat from the liquid at one side of the slider to liquid at the other side of the slider so as to reduce greatly transfer of heat past the slider from relatively hot liquid in one end chamber of the barrel to relatively cool liquid in the other end chamber of the barrel.

Sufficient conduction of heat through the clearance between the slider 4 and the passage constricted section 3 should be afforded, however, to deter freezing of liquid in the cool liquid end of the barrel. The thermal insulator can be designed to provide the desired amount of liquid between the slider 4 and the passage constricted section 3 simply by selecting the relative diameters of the slider and of such passage section.

Transfer of heat between the bodies of liquid in opposite ends of the thermal insulator barrel 1 is further deterred by making the slider 4 of thermal insulating plastic material such as one of the plastics discussed above as being used for the barrel. The material of the slider may be the same as the material of the barrel.

The slider 4 has a clearance fit in the passage constricted section 3, but preferably the tolerance of such fit is generous so as to minimize wear between the relatively movable parts 3 and 4, and virtually to eliminate friction between these parts for facilitating rapid axial movement of the slider relative to the passage constricted section in response to unbalanced liquid pressure in opposite ends of the thermal insulator barrel 1.

Each end of the barrel 1 may have circumferentially spaced ribs 15 extending longitudinally of the barrel to afford easy gripping of the barrel for preventing it from turning while connecting a pipe P to an end of the barrel.

I claim:

1. A thermal insulator comprising a barrel of thermal insulating material having a connecting passage therein in communication with opposite ends of said barrel including a constricted section and expanded sections at opposite sides of said constricted section, respectively, a slider received in said barrel and reciprocable in said connecting passage, said slider being sufficiently smaller than said constricted section as to always enable at least some flow of liquid through said constricted section in either direction, and opposed spring means always clamping said slider therebetween and operable to lodge said slider in said passage constricted section when the pressure of the liquid in the opposite ends of said barrel is equalized for restricting communication through said connecting passage between the opposite ends of said barrel, said opposed spring means being arranged in tandem and having their adjacent ends always engaging opposite ends of said slider, respectively, and always exerting opposed spring pressure on said slider in all reciprocated positions of said slider, for reciprocation of said slider out of said passage constricted section in either direction into a passage expanded section by differential liquid pressure exceeding differential spring means pressure on opposite ends of said slider to enable the flow of liquid through said connecting passage to increase and returnable into said passage constricted section by differential spring means pressure when the pressure of the liquid in the opposite ends of said barrel again becomes equalized.

2. The thermal insulator defined in claim 1, in which the slider is of cylindrical cross section and the opposite ends of the slider are of shallow conical shape engaged by the respectively adjacent spring means.

3. The thermal insulator defined in claim 1, each spring means including a helical compression spring, and a spider fixed in the barrel at the end of a spring remote from the slider and engageable by the adjacent end of such spring.

4. The thermal insulator defined in claim 3, in which the spider includes a hollow hub and a plurality of arms projecting generally radially from said hub engageable by the adjacent end of a helical compression spring.

5. The thermal insulator defined in claim 1, in which the opposed spring means are alike.

6. The thermal insulator defined in claim 1, in which the passage constricted section is located substantially centrally of the barrel.

7. The thermal insulator defined in claim 6, and ribs disposed in the passage expanded sections generally in axial alignment with the walls of the passage constricted section beyond opposite ends thereof lengthwise of the barrel for guiding movement of the slider beyond both opposite ends of the passage constricted section into the passage expanded sections, respectively.

* * * * *